US007699542B2

(12) United States Patent
Watanabe et al.

(10) Patent No.: US 7,699,542 B2
(45) Date of Patent: Apr. 20, 2010

(54) PORTABLE INFORMATION TERMINAL WITH CAMERA

(75) Inventors: Nobuaki Watanabe, Tokyo-to (JP); Yoshiyuki Ohzeki, Misato (JP)

(73) Assignee: Nidec Copal Corporation, Tokyo (JP)

( * ) Notice: Subject to any disclaimer, the term of this patent is extended or adjusted under 35 U.S.C. 154(b) by 75 days.

(21) Appl. No.: 10/555,815

(22) PCT Filed: Oct. 14, 2004

(86) PCT No.: PCT/JP2004/015145

§ 371 (c)(1),
(2), (4) Date: Nov. 7, 2005

(87) PCT Pub. No.: WO2005/036251

PCT Pub. Date: Apr. 21, 2005

(65) Prior Publication Data

US 2007/0077061 A1    Apr. 5, 2007

(30) Foreign Application Priority Data

Oct. 14, 2003  (JP) .............................. 2003-353178

(51) Int. Cl.
*G03B 9/40* (2006.01)
(52) U.S. Cl. ....................................... 396/448; 396/510
(58) Field of Classification Search ................ 396/429, 396/452–504, 493, 448, 510; 348/362–367
See application file for complete search history.

(56) References Cited

U.S. PATENT DOCUMENTS 5,869,896 A * 2/1999 Baker et al. ................. 257/724
6,447,175 B1 * 9/2002 Ogawa ........................ 396/488
6,452,732 B1 * 9/2002 Okada et al. ................. 359/813
6,554,502 B2 * 4/2003 Naganuma ................... 396/454
2002/0048459 A1 * 4/2002 Mishio ........................ 396/429
2002/0197077 A1 * 12/2002 Eguro ......................... 396/451
2004/0062542 A1 * 4/2004 Watanabe .................... 396/463
2004/0105028 A1 * 6/2004 Watanabe .................... 348/363

FOREIGN PATENT DOCUMENTS

| JP | 2756286 | 3/1998 |
| JP | 2001-83569 | 3/2001 |
| JP | 2001-309003 | 11/2001 |
| JP | 3261549 | 12/2001 |
| JP | 2002-281142 | 9/2002 |
| JP | 2003-219229 | 7/2003 |
| JP | 2003-274234 | 9/2003 |

* cited by examiner

*Primary Examiner*—Reena Aurora
(74) *Attorney, Agent, or Firm*—Sterne, Kessler, Goldstein & Fox P.L.L.C.

(57) ABSTRACT

A transparent plate is fixed to the body of a mobile phone with a camera in order to cover an aperture for photography. A solid-state image sensor (4) is placed on the image plane of a photographing optical system. Between a base plate having an aperture for regulating the optical path of photographing light and a cover plate having an aperture, a blade chamber for housing a shutter blade is provided, and an actuator for driving the shutter blade is fixed to the outer surface of the blade chamber. The base plate and the cover plate are arranged in the body so that the aperture is located between the transparent plate and the photographing optical system.

11 Claims, 15 Drawing Sheets

FIG.10
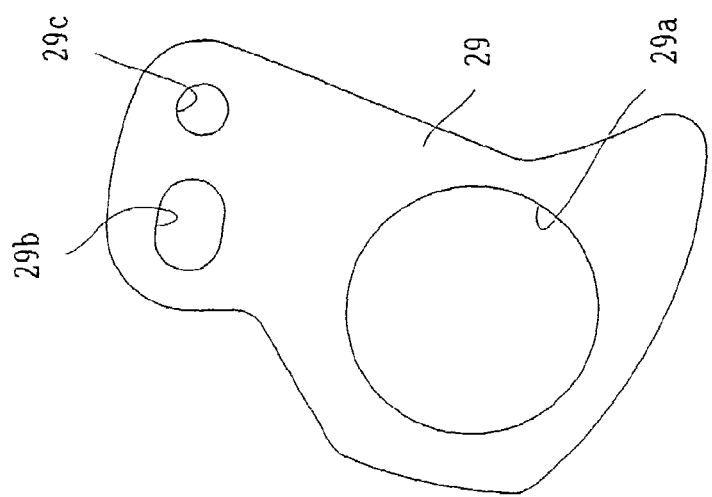
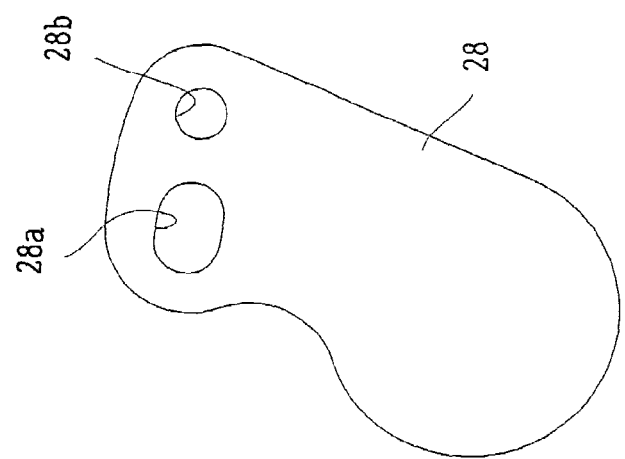
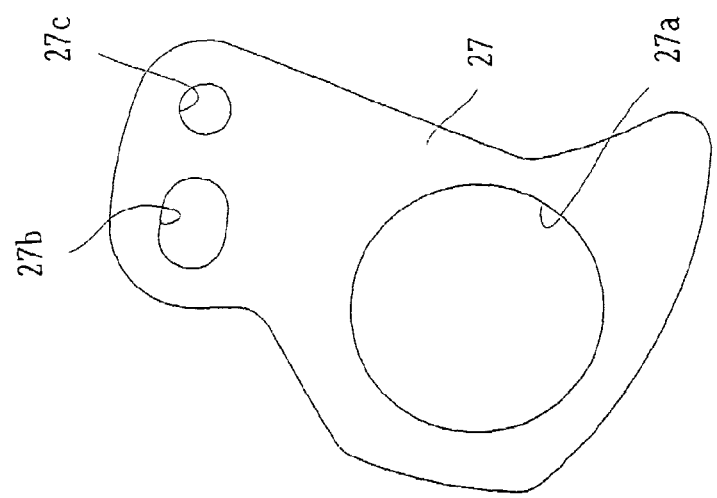

PORTABLE INFORMATION TERMINAL WITH CAMERA

TECHNICAL FIELD

This invention relates to a portable information terminal with a camera in which blade members, such as shutter blades and stop blades, are reciprocated by an actuator.

BACKGROUND ART

Each of a lens shutter device, a stop device, and a filter device, used in a camera, has a single blade member or a plurality of blade members so that they are reciprocated by an actuator. Each of these devices is sometimes constructed as an independent unit, but at least two of them may be constructed as one unit. Such lens shutter devices are often designed so that two blades are used. However, in cameras of small lens diameters, a single blade may be used. In the case of stop devices incorporated in the cameras of small lens diameters, it is customary that a single blade having a small circular aperture is moved in and out of a photographing optical path when the necessity arises.

Filter devices, in many cases, are provided with a single blade similar in shape to the blade of the stop device (however, its aperture may have almost the same size as an aperture for regulating a photographing optical path, provided in a base plate) and are mounted, with an ND filter plate so as to cover the aperture in the proximity of the aperture. However, an alternative structure is also proposed in which two blades, each having the above shape, are provided and the blade of the ND filter plate is sandwiched between them so as to cover their apertures, and these three blades are rotated reciprocatably in the same direction simultaneously by the same angle.

The recent tendency of portable information terminals, such as mobile phones and PDAs, is that they are equipped with cameras. However, even though the shutter devices, the stop devices, and the filter devices, mentioned above, are downsized, there is a limit to downsizing of the actuator and an arrangement in the terminal is not easy. In addition, it is not admitted that the portable information terminal itself is oversized for the reason that the devices mentioned above are incorporated. Thus, it is understood that when these devices are incorporated, an image of good quality is obtained, but in practice, it is the present condition that they are not incorporated. (Refer to, for examples, Patent References 1 and 2 described below.)

Patent Reference 1: Japanese Patent Laid open publication No. 2001-309003

Patent Reference 2: Japanese Patent Laid open publication No. 2003-219229

DISCLOSURE OF THE INVENTION

A conventional portable information terminal with a camera, as set forth in Patent Reference 2, is such that an aperture for photography is provided in its body and a photographing optical system is placed inside the body, in the proximity of the aperture. Those are required that a dimension along the optical axis of the photographing optical system is kept to a minimum to obtain the thinnest possible body and space efficiency in the body is improved so that the entire body is downsized. On the other hand, in the shutter device, the stop device, and filter device, mentioned above, blade members are generally mounted on the base plate in a blade chamber, and the actuator is mounted on the outer surface of the base plate. In an ordinary camera, it is common practice to interpose the blade members and the base plate between a plurality of lenses constituting the photographing optical system. Consequently, in the case where those devices are assembled in the portable information terminal as mentioned above, the actuator is relatively bulky, and thus there is the problem that the dimension along the optical axis of the photographing optical system must be increased and as a result, the space efficiency in the body is impaired.

In order to solve this problem so that the devices can be easily adopted, it is conceivable that the blade members and the base plate are interposed not between the plurality of lenses constituting the photographing optical system, but between the aperture for photography in the body and the photographing optical system. Whereby, the position of the actuator is shifted toward the aperture for photography. As such, an increase of the dimension along the optical axis of the photographing optical system is avoided accordingly, so that the slim design of the body becomes possible and relatively large space convenient for placing other members can be ensured. In such a structure, however, not only the front of the photographing optical system as in the conventional way, but also the blade members are exposed to the exterior. Consequently, as in the conventional way, there are the possibilities that dust adheres to the blade members as well as to the photographing optical system, that the blade members are pressed with fingers, and moreover, that dust penetrates into the interior of the body from clearance between the blade members in an operating area.

When the dust adheres to the blade members, it affects the operation of the blade members, while when the dust adheres to the photographing optical system, it affects directly to image quality. When the blade members are touched or pressed with fingers in error, they are deformed or contaminated with fingerprints. This affects the operation of the blade members. In addition, when the dust penetrates into the interior of the body from the clearance between the blades members in the operating area, it gradually affects the operation of the actuator and adheres to the imaging surface of a solid-state image sensor and what's more, the dust also affects the functions of components other than the camera.

When the dust and fingerprints adhere to the front of the photographing optical system, formerly it has been necessary to wipe only its surface. However, when the blade members and the base plate are interposed between the aperture for photography in the body and the photographing optical system, the photographing optical system originally has a small diameter and is placed at the back of the body in accordance with the arrangement of the blade members and the base plate. Consequently, a dust-wiping operation is not easy and it becomes extremely difficult to remove the dust completely. Patent Reference 1 discloses the structure in which a protection cover is mounted in the body so that when photographing is not performed, the front of the photographing optical system is covered by the protection cover. However, even though such a protection cover is adopted, the operation moving the protection cover in and out of the front of the photographing optical system is troublesome. Moreover, sometimes the aperture for photography is forgotten to be covered by inadvertence after photography or intentionally uncovered for a long time. Even though the above operation is made each time photographing is performed, the penetration of fine dust into the interior of the body cannot be prevented in photography.

It is an object of the present invention to provide a portable information terminal with a camera in which the blade members provided in the shutter device, the stop device, and the filter device and the base plate mounted with the blade members are interposed between the aperture for photography in the body and the photographing optical system so that the slim design of the body and the effective utilization of space in the interior of the body can be attained, and in which the penetration of dust into the interior of the body from the aperture for photography is prevented.

In order to achieve this object, the portable information terminal with a camera of the present invention includes a body provided with an aperture for photography; a transparent plate mounted in the body so that the aperture for photography can be covered; a photographing optical system placed opposite to the transparent plate in the body; a solid-state image sensor located at the position of the image plane of the photographing optical system; a base plate having an aperture for regulating the optical path of photographing light so that the aperture for regulating the optical path is interposed between the transparent plate and the photographing optical system; at least one blade member reciprocatably mounted on the base plate, movable on and out of the aperture for regulating the optical path; and an actuator mounted on the photographing-optical-system-side surface of the base plate, driving the blade member.

The portable information terminal with a camera further includes at least one second blade member reciprocatably mounted on the base plate, movable on and out of the aperture for regulating the optical path; and a second actuator mounted on the base plate, driving the second blade member. One of the blade member and the second blade member may be a shutter blade and the other may be a blade member for beam attenuation. In this case, the blade member for beam attenuation may be a stop blade that has an aperture smaller than the aperture for regulating the optical path, moved on and out of the aperture for regulating the optical path, and is rotatably mounted on the base plate. Alternatively, the blade member for beam attenuation includes two blade members, each having an aperture, moved on and out of the aperture for regulating the optical path, and a single blade member made with a filter plate, sandwiched between the two blade members so as to cover the apertures of the two blade members, and these three blade members may be rotatably mounted at the same position of the base plate.

The blade member is a stop blade that has an aperture smaller than the aperture for regulating the optical path, moved on and out of the aperture for regulating the optical path, and may be rotatably mounted on the base plate.

The blade member is a filter blade that has an aperture, moved on and out of the aperture for regulating the optical path and mounted with a filter plate on one surface in order to cover the aperture. The filter blade is interposed between the base plate and a cover plate having the aperture for the optical path, and one of the base plate and the cover plate is provided with a relief portion so as to avoid coming in contact with the filter plate when the filter blade is rotated.

The blade member includes two blades, each having an aperture, moved on and out of the aperture for regulating the optical path, and a single blade made with a filter plate, sandwiched between the two blades so as to cover the apertures of the two blades, and these three blades are rotatably mounted at the same position of the base plate.

The blade member is a single filter blade made with a filter plate. The filter blade is interposed between the base plate and a cover plate having an aperture for the optical path, and each of the base plate and the cover plate is provided with a relief portion so as to avoid coming in contact with the filter plate when the filter blade is rotated.

The portable information terminal with a camera can be loaded into any of a mobile phone, a mobile information terminal such as a PDA, and a personal computer.

BRIEF DESCRIPTION OF THE DRAWINGS

FIG. 10 is an explanatory view showing members constituting a filter blade group of FIG. 9.

BEST MODE FOR CARRYING OUT THE INVENTION

Figure 1:
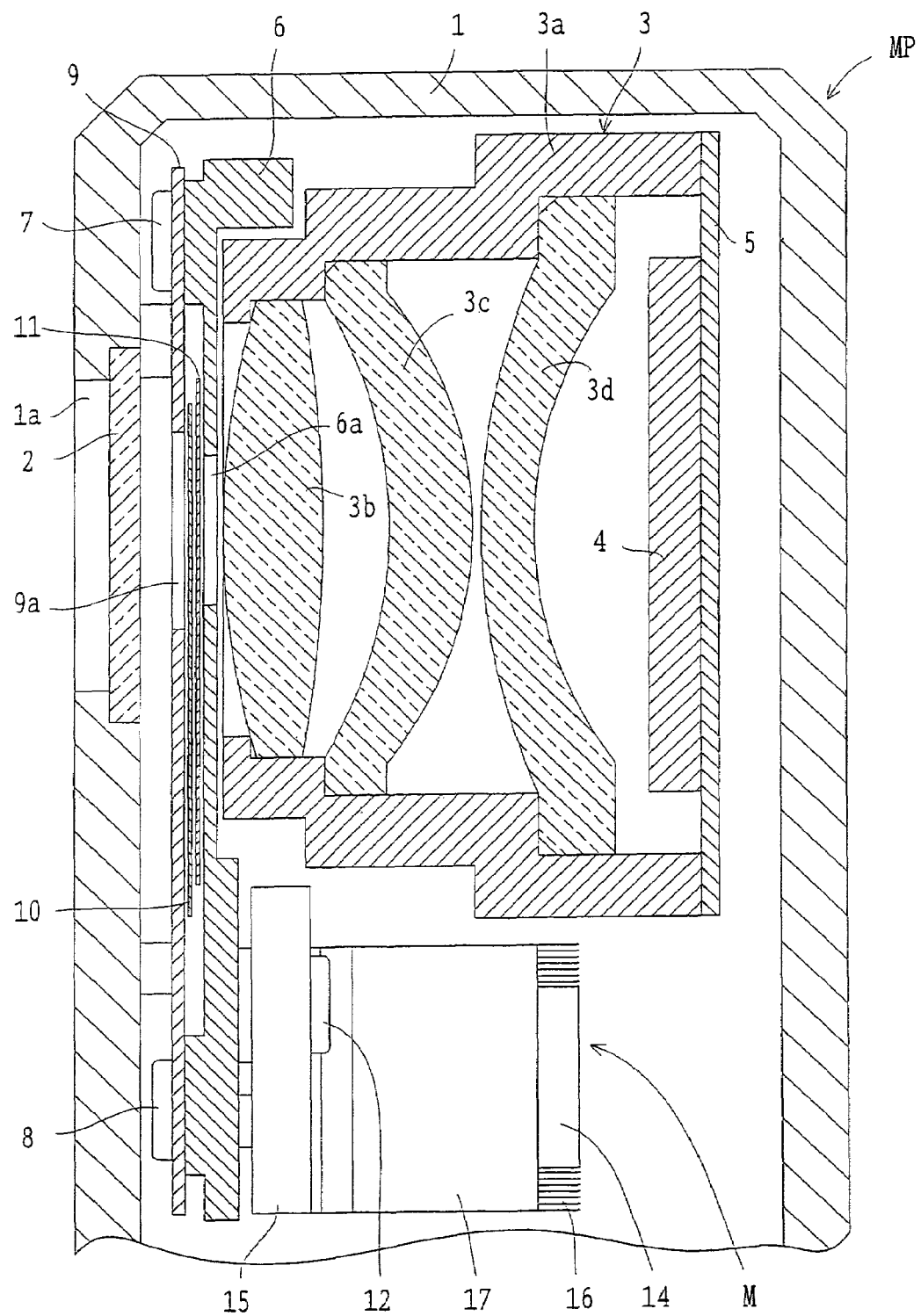
FIG. 1 is a sectional view showing essential parts of Embodiment 1 of the portable information terminal with a camera according to the present invention.

The present invention will be described in accordance with seven embodiments shown in the drawings. FIGS. 1-6 are used to explain Embodiment 1; FIGS. 7-10, Embodiment 2; and FIGS. 11, 12, 13, 14, and 15, Embodiments 3, 4, 5, 6, and 7, respectively.

Embodiment 1

Figure 2:
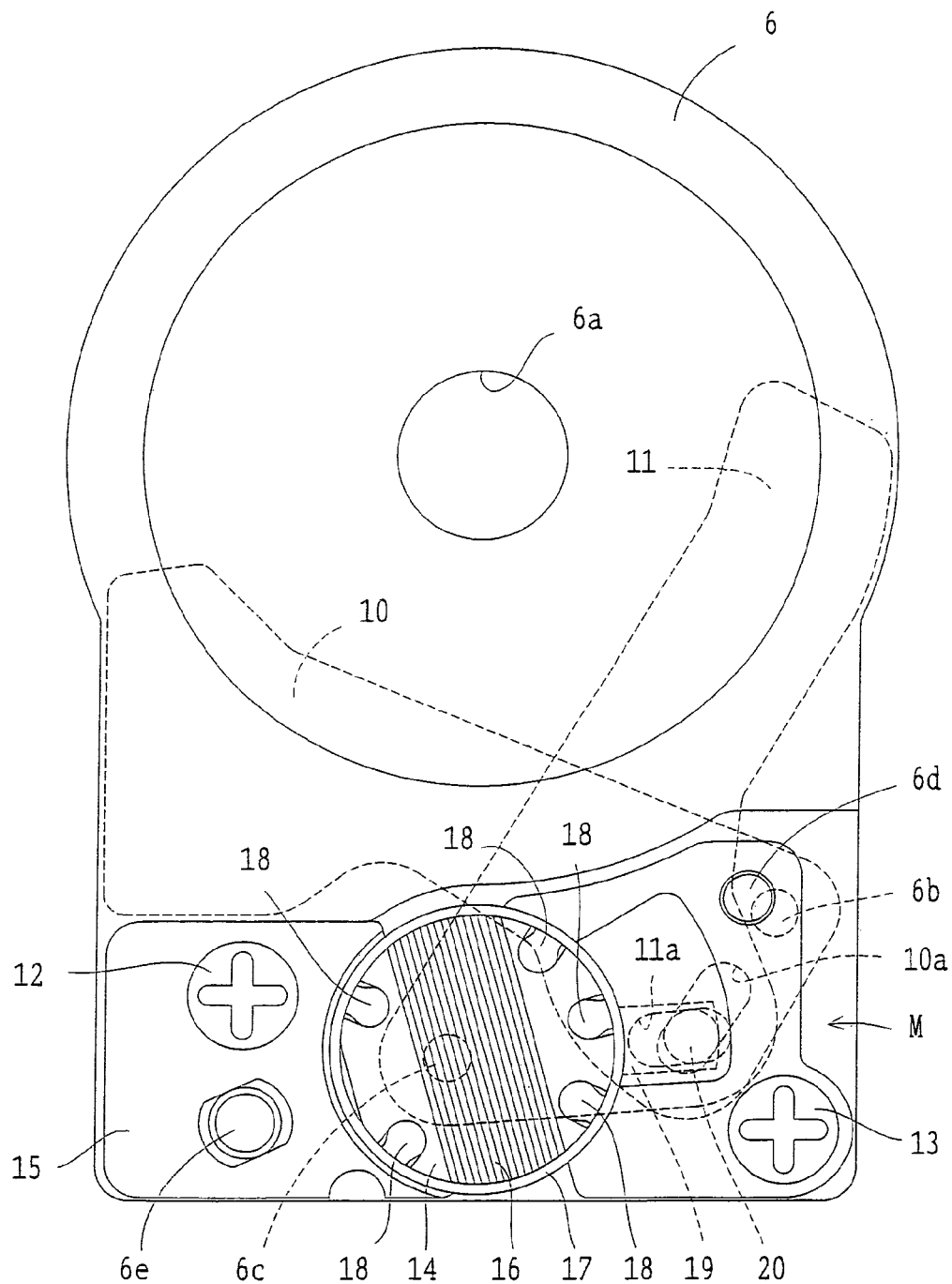
FIG. 2 is a plan view showing the unit of a shutter device used in Embodiment 1, viewed from the right of FIG. 1.
Figure 3:
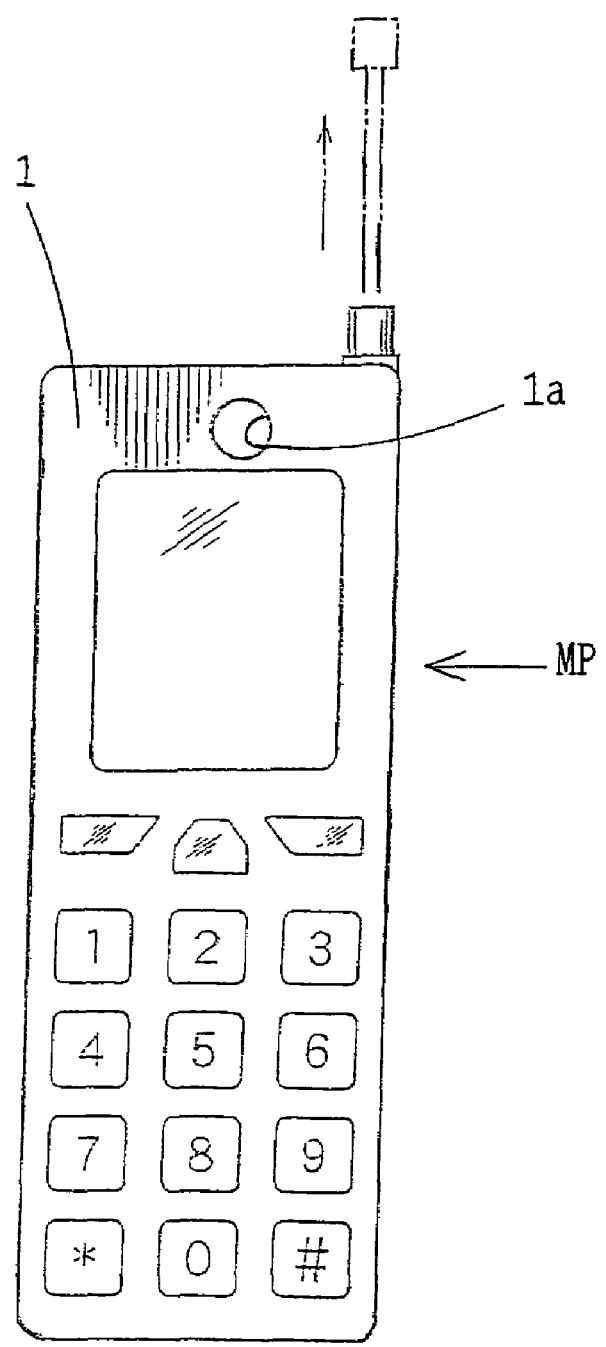
FIG. 3 is a front view showing one example of a mobile phone incorporating the shutter device of Embodiment 1.

This embodiment is one example of the portable information terminal with a camera provided with a shutter device alone. FIG. 1 is a sectional view showing essential parts in a mobile phone with a camera. FIG. 2 is a plan view showing the unit alone of the shutter device, viewed from the right of FIG. 1. FIG. 3 is a front view showing the whole of the mobile phone.

A body 1 of a mobile phone MP is provided with an aperture 1a for photography. The aperture 1a for photography, as shown in FIG. 3, has a circular shape in an ordinary case, but as will be seen from the description to be given later, it need not necessarily be circular. As shown in FIG. 1, a transparent plate 2 is fixed to the inner side of the body 1 by an adhesive in order to cover the aperture 1a for photography. In the interior of the body 1, a photographing optical system 3 is located opposite to the transparent plate 2. In Embodiment 1, the photographing optical system 3 is constructed with three lenses 3b, 3c, and 3d attached to a lens frame 3a. A solid-state image sensor 4 is located at the position of the image plane of the photographing optical system 3 behind the lens 3d and is fixed to the lens frame 3a through a substrate 5. The photographing optical system 3 and the solid-state image sensor 4, assembled as mentioned above, are mounted in the body 1 through a proper means, not shown.

Subsequently, in accordance with FIGS. 1 and 2, a description will be given of the structure of a shutter device unit used in Embodiment 1. A cover plate 9 is fastened to a base plate 6 by screws 7 and 8, and a blade chamber is provided between the base plate 6 and the cover plate 9. The base plate 6 is made of synthetic resin and has a circular aperture 6a for regulating the optical path of photographing light, and the cover plate 9 also has an aperture 9a larger in diameter than the aperture 6a. The base plate 6 and the cover plate 9 are such that their apertures 6a and 9a are interposed between the transparent plate 2 and the photographing optical system 3. The base plate 6, as shown in FIG. 2, has shanks 6b and 6c on its blade-chamber-side surface and positioning pins 6d and 6e on its blade-chamber-outside surface. In the blade chamber, shutter blades 10 and 11 having slots 10a and 11a are arranged and rotatably mounted on the shanks 6b and 6c, respectively.

An actuator driving the shutter blades 10 and 11 is fastened to the blade-chamber-outside surface of the base plate 6 by screws 12 and 13. This actuator is a current-controlled motor M, often referred to as a moving-magnet motor, in which a rotor made with a permanent magnet can be turned reciprocatably only within a preset angle range in accordance with the conductive direction of a stator coil. The structure of this motor, although well known, for example, by Japanese Patent Laid open publication No. 2000-60088, will be briefly explained here.

The stator of the motor M includes a first stator frame 14, a second stator frame 15, a coil 16, and a yoke 17. Holes provided in the second stator frame 15 are fitted to the positioning pins 6d and 6e, and the stator is fastened to the base plate 6 by the screws 12 and 13. The first stator frame 14 is shaped like a cup and its open end is blocked by the second stator frame 15. After the coil 16 is wound around both frames, the cylindrical yoke 17 is fitted to the first stator frame 14. Five magnetic bars 18, referred to as iron pins, are embedded in the first stator frame 14.

The rotor of the motor M, although not shown clearly, is incorporated in the first stator frame 14 and is journaled by the first stator frame 14 and the second stator frame 15. The coil 16 is wound around in such a way as to surround their bearing portions. The rotor is made with the permanent magnet, and at the top of an arm 19 made of synthetic resin, constructed integrally with the permanent magnet and extending radially, an output pin 20 is provided so as to become parallel with its rotary shaft. The output pin 20 passes through circulate arc slots, not shown, configured in the second stator frame 15 and the base plate 6 and is fitted into the slots 10a and 11a of the shutter blades 10 and 11 in the blade chamber.

According to the structure of Embodiment 1, as mentioned above, the base plate 6 and the cover plate 9 between which the blade chamber is provided are interposed between the transparent plate 2 and the photographing optical system 3 in the body 1, and thus in FIG. 1, it is possible to shift the motor to the left and to ensure a wide space on the right side of the motor. In this way, the shutter device is placed in a state where space efficiency in the body is improved. If the base plate 6 and the cover plate 9 are interposed between the three lenses 3b, 3c, and 3d of the photographing optical system 3, a narrow space will be merely provided on each of the left side of the cover plate 9 and the right side of the motor M. Consequently, the arrangement of other components becomes troublesome and the thickness of the body 1 (the dimension in a lateral direction in FIG. 1) must be increased. Moreover, since it becomes difficult to attach the three lenses 3b, 3c, and 3d to the single lens frame 3a and to unify the photographing optical system 3 and the solid-state image sensor 4 like Embodiment 1, the number of parts is increased and the adjustment of assembly becomes troublesome, with the result that cost may be increased.

According to the structure of Embodiment 1, the transparent plate 2 is mounted in the body 1 so as to cover the aperture 1a for photography, and therefore, even when the base plate 6 and the cover plate 9 are interposed between the transparent plate 2 and the photographing optical system 3, the finger cannot be put into the aperture from the exterior nor does dust penetrate into the interior of the body. If the transparent plate 2 is not provided, the finger may touch the shutter blades 10 and 11 and the lens 3b to contaminate their surfaces. In the case where dust penetrates, it adheres to the surface of the lens 3b, and some particles of dust penetrating into the blade chamber adhere to the shutter blades 10 and 11 and others pass through slots provided in the base plate 6 and the second stator frame 15 for the operation of the output pin 20 to penetrate into the first stator frame 14 in which the rotor is placed. In addition, dust penetrating into space in which other components are arranged will adhere to the imaging surface of the solid-state image sensor 4 unless the mobile phone is constructed as in Embodiment 1. This affects the operation of the shutter blade and the quality of a photographed image in course of time, but Embodiment 1 does not encounter such problems.

Subsequently, the operation of Embodiment 1 will be briefly described. FIG. 2 shows the initial state of Embodiment 1. That is, the power source of the camera is turned on and the shutter blades 10 and 11 fully open the aperture 6a. Hence, the solid-state image sensor 4 is exposed to light from an object and it is possible to observe an object image through a display device. In this case, the coil 16 of the motor is not energized, but as is well known, a force of rotation in a clockwise direction due to a magnetic attractive force exerted between the permanent magnet and the magnetic bars 18 is imparted to the rotor, not shown. Thus, forces of rotation in opposite directions due to the output pin 20 are imparted to the shutter blades 10 and 11, which come in contact with a stopper, not shown, so that this state is maintained.

When a release button is pushed for photography, electric charges stored in the solid-state image sensor 4 are discharged by a signal from an exposure control circuit, not shown, and exposure for photography is started. After a predetermined time passes, the coil 16 of the motor is energized by the signal from the exposure control circuit and the rotor is turned counterclockwise. Consequently, the shutter blades 10 and 11 are rotated in opposite directions by the output pin 20 and close the aperture 6a, and then, abut on stoppers, not shown, to stop. In this closed state, when imaging information is transferred to a memory device, the coil 16 is energized in a direction opposite to the above case. The rotor is thus turned clockwise and causes the shutter blades 10 and 11 to perform an opening operation. When the shutter blades 10 and 11 fully open the aperture 6a and abut on the stoppers, not shown, to stop, power to the coil 16 is disconnected and the shutter device regains the initial state of FIG. 2.

Figure 4:
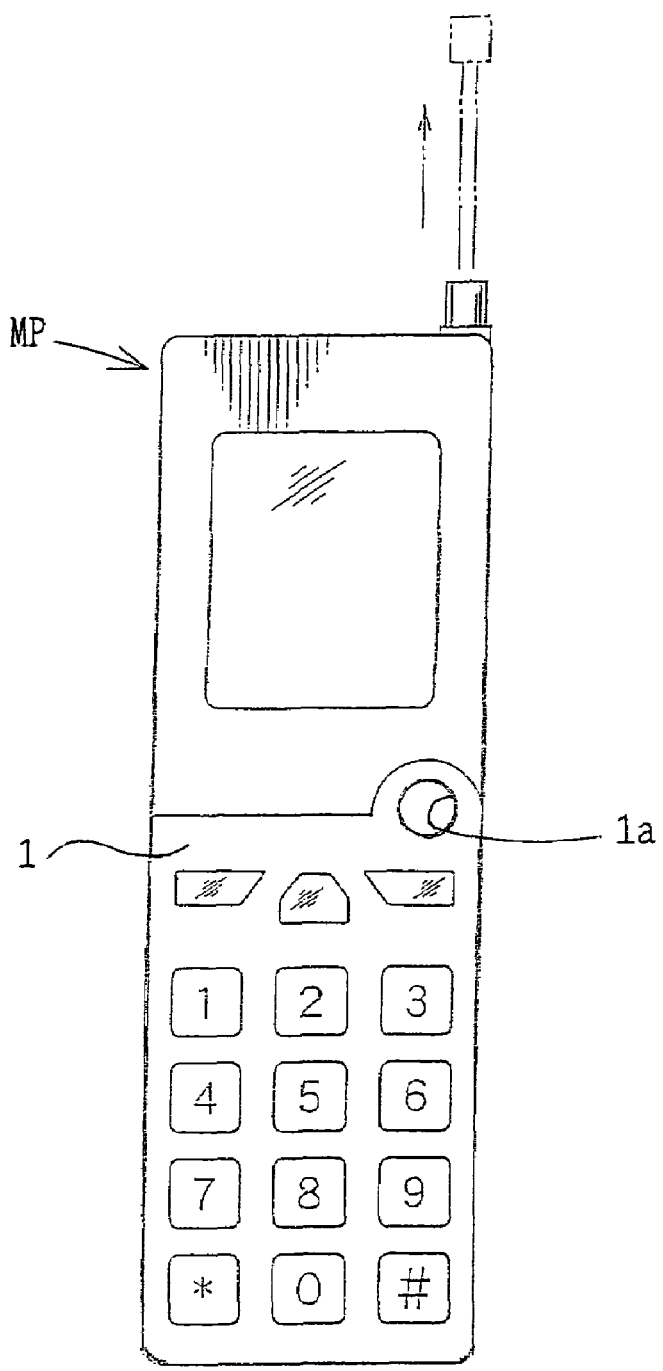
FIG. 4 is a front view showing another example of the mobile phone incorporating the shutter device of Embodiment 1.
Figure 5:
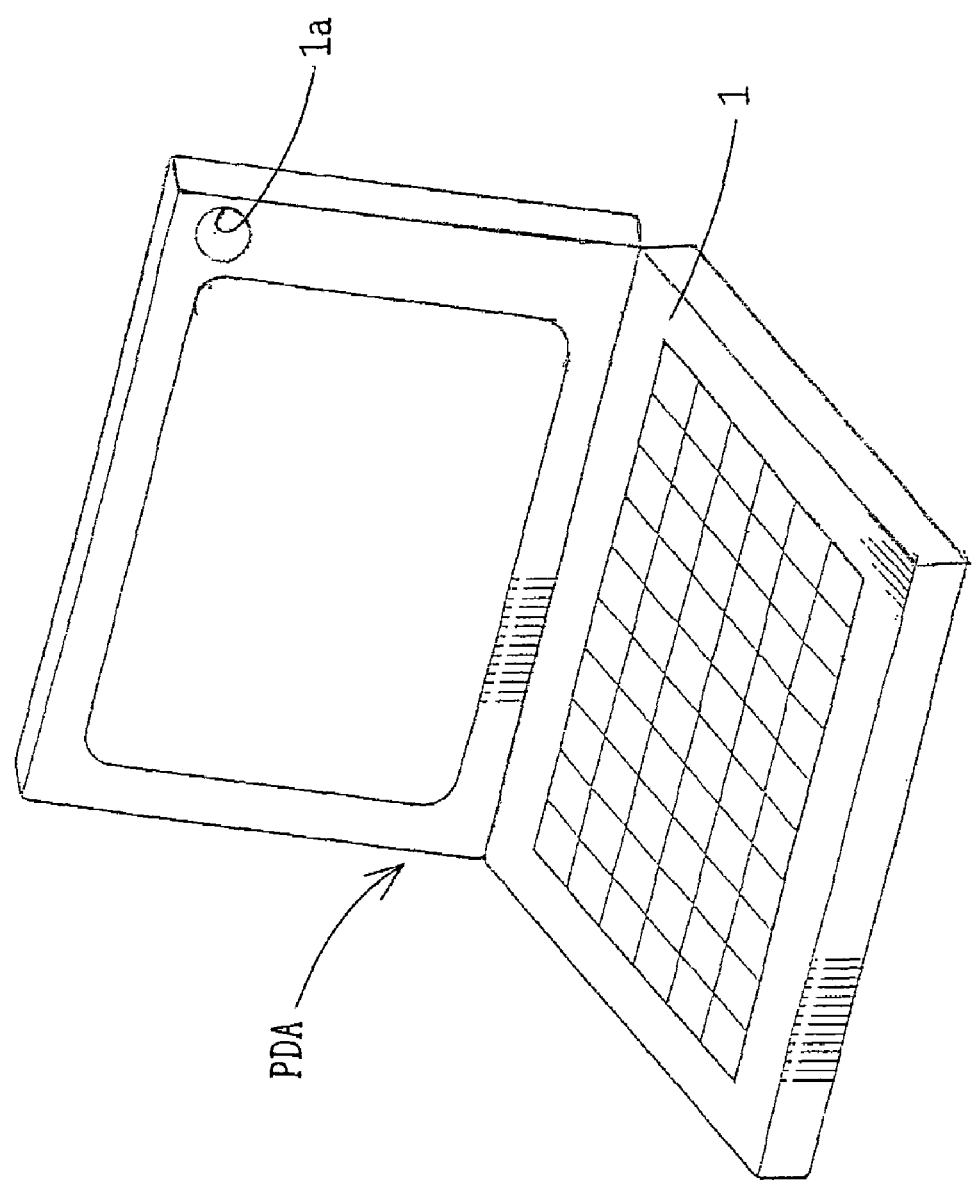
FIG. 5 is a perspective view showing a PDA incorporating the shutter device of Embodiment 1.
Figure 6:
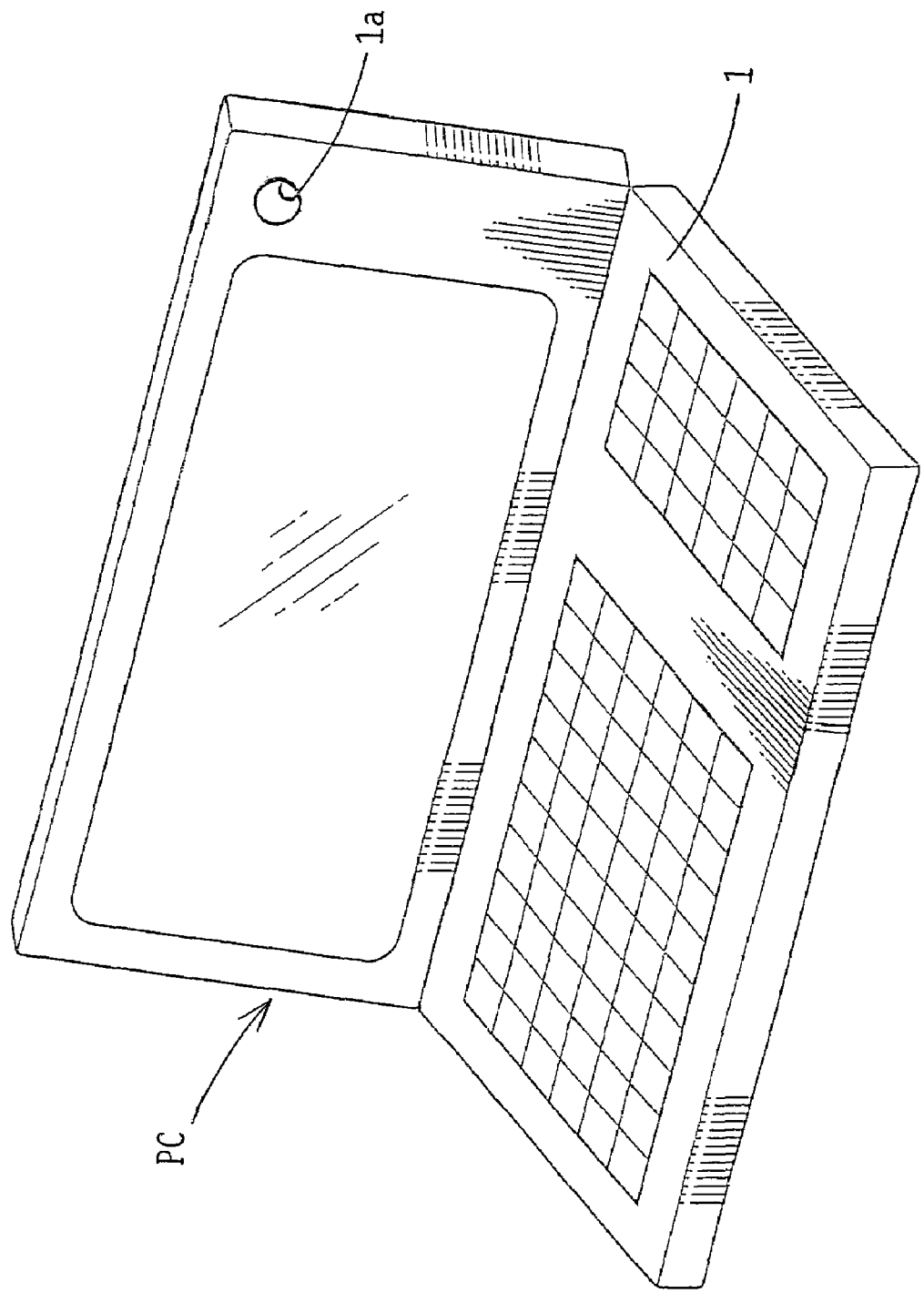
FIG. 6 is a perspective view showing a personal computer incorporating the shutter device of Embodiment 1.

Also, in the above description, reference has been made to the case where the present invention is constructed as the mobile phone MP of the type shown in FIG. 3. However, it is needless to give a description in accordance with detailed drawings that when an arrangement in the portable information terminal of the present invention is the same, the shutter device of Embodiment 1, as shown in FIG. 4, can be housed behind the aperture 1a for photography provided in the body 1 of the folding mobile phone MP; as shown in FIG. 5, of a high-function electronic note PDA such as a PDA (personal digital assistance); or as shown in FIG. 6, of a personal computer PC. This also holds for various devices of the embodiments to be described below.

Embodiment 2

Figure 7:
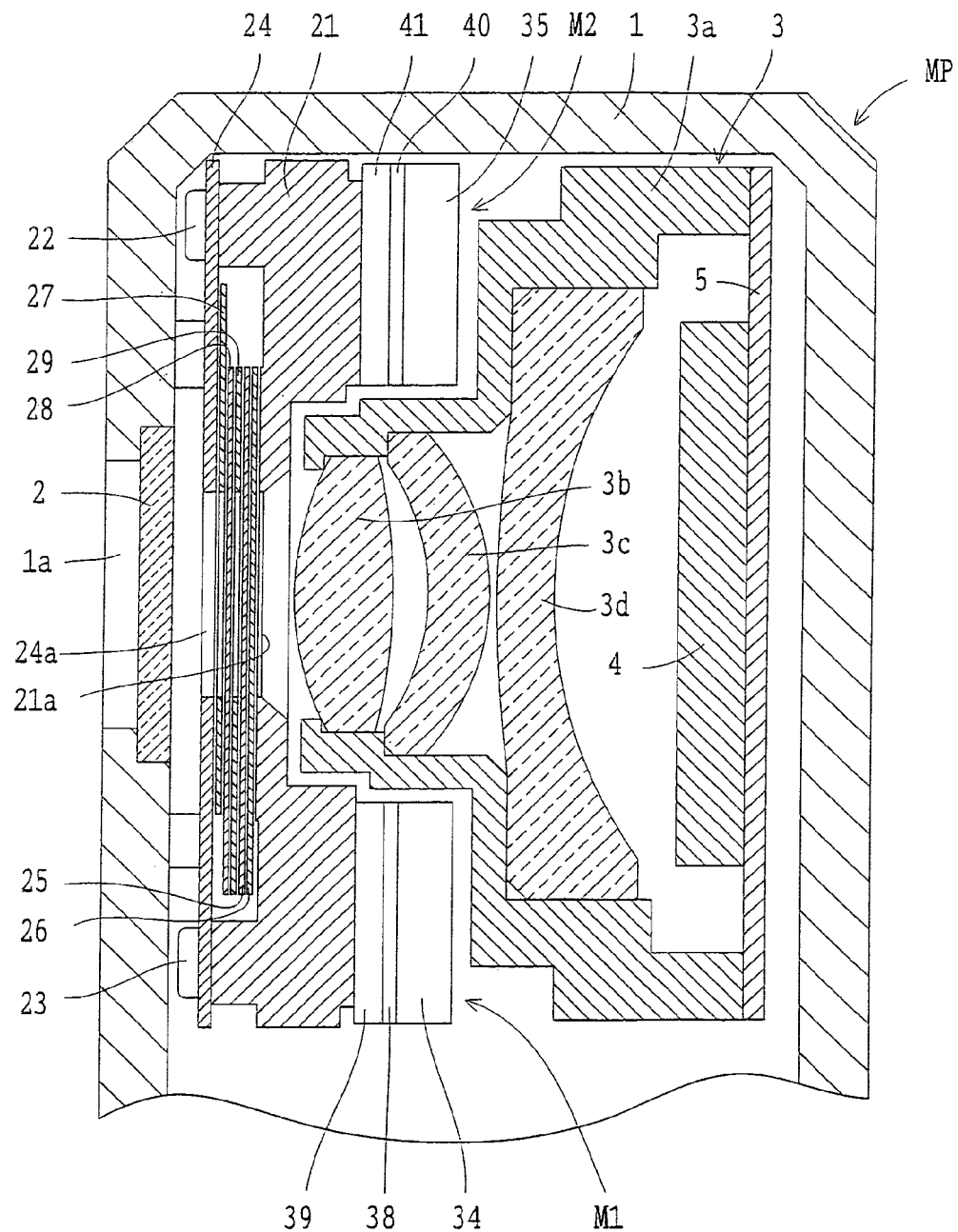
FIG. 7 is a sectional view showing essential parts of Embodiment 2 of the portable information terminal with a camera according to the present invention.
Figure 8:
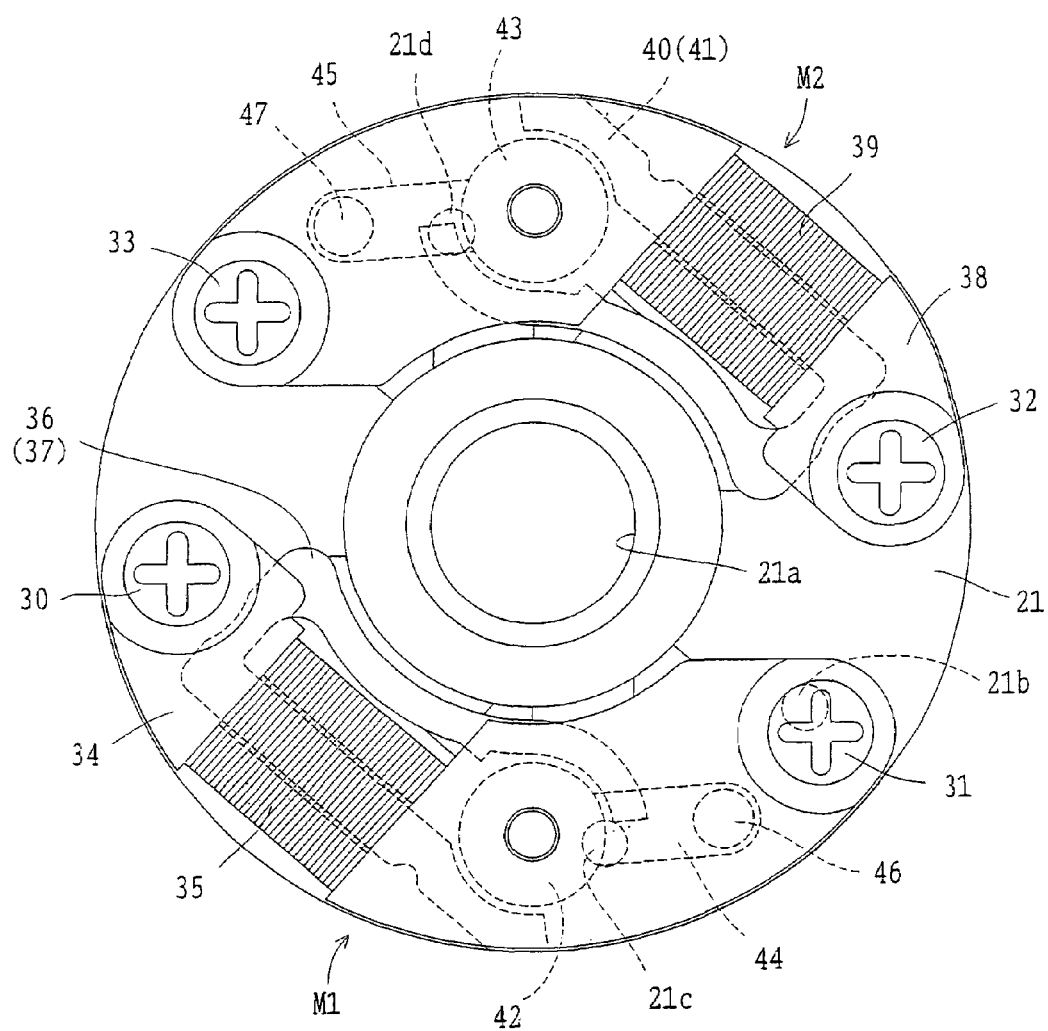
FIG. 8 is a plan view showing the unit of a shutter device and a filter device used in Embodiment 2, viewed from the right of FIG. 7.
Figure 9:
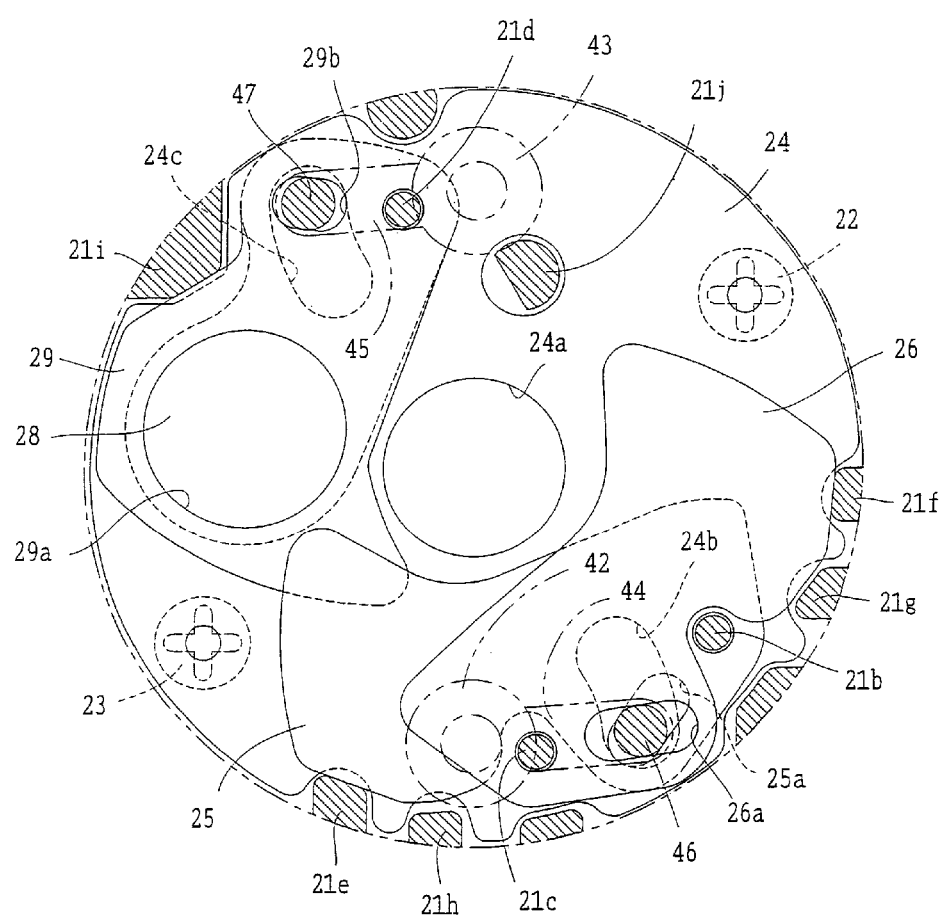
FIG. 9 is a plan view showing the interior of a blade chamber in FIG. 8, removing a base plate.

In accordance with FIGS. 7-10, Embodiment 2 will be explained below. FIG. 7 is a sectional view showing essential parts of this embodiment. FIG. 8 is a plan view showing a unit, viewed from the right of FIG. 7. FIG. 9 is a plan view showing the interior of a blade chamber in FIG. 8, removing the base plate. FIG. 10 is an explanatory view showing members constituting filter blades of FIG. 9. In Embodiment 2, a shutter device and a filter device are constructed as one unit and are assembled in the mobile phone MP with a camera of the same type as in Embodiment 1. The members other than the unit, although somewhat different in shape, are substantially the same as in Embodiment 1. Thus, in the drawings of Embodiment 2, reference numerals and symbols identical with those of Embodiment 1 are used for the members other than the unit.

The structure of Embodiment 2 will be described below. The body 1 of the mobile phone is provided with the aperture 1a for photography, and the transparent plate 2 is mounted in the body 1 so as to cover the aperture 1a for photography. The photographing optical system 3 is constructed with the three lenses 3b, 3c, and 3d attached to the lens frame 3a, and the solid-state image sensor 4 is fixed to the lens frame 3a through the substrate 5.

Subsequently, a description will be given of the structures of the shutter device and the filter device adopted in Embodiment 2. A cover plate 24 is fastened to a base plate 21 by screws 22 and 23, and the blade chamber is provided between the base plate 21 and the cover plate 24. The base plate 21 is made of synthetic resin and has a circular aperture 21a for regulating a photographing optical path, and the cover plate 24 also has an aperture 24a of almost the same diameter as the aperture 21a. The base plat 21 and the cover plate 24 are such that their apertures 21a and 24a are interposed between the transparent plate 2 and the photographing optical system 3. The base plate 21, as shown in FIG. 9, has three shanks 21b, 21c, and 21d and six stoppers 21e, 21f, 21g, 21h, 21i, and 21j on its blade-chamber-side surface so that tops of the shanks 21b, 21c, and 21d and the stopper 21j are fitted into holes provided in the cover plate 24. Also, in FIG. 9, the circular contour of the base plate 21 is indicated by a two-dot chain line.

In the blade chamber, shutter blades 25 and 26 having slots 25a and 26a are arranged and rotatably mounted on the shanks 21b and 21c, respectively. Three blades 27, 28, and 29 are arranged in mutually overlapping relation from the cover-plate-24 side to the shutter blade 25. Of these blades, the blades 27 and 29 arranged on both sides, as illustrated in FIG. 10, assume exactly the same shape and have circular apertures 27a and 29a, respectively, somewhat larger than the aperture 24a of the cover plate 24, together with slots 27b and 29b and round holes 27c and 29c at their left ends. The blade 28 is made with an ND filter plate and has a slot 28a and a round hole 28b at its left end. The round holes 27c, 28b, and 29c are fitted to the shank 21d so that these blades 27, 28, and 29 can be rotated on the shank 21d.

As shown in FIG. 8, an actuator driving the shutter blades 25 and 26 is fastened to the blade-chamber-outside surface of the base plate 21 by screws 30 and 31, while another actuator driving three blades 27, 28, and 29 constituting a filter blade group is fastened by screws 32 and 33. Each of these actuators is different in stator structure from the moving-magnet motor of Embodiment 1 and is designed to be flat as a whole. This motor is also the current-controlled, moving-magnet motor in which the rotor made with the permanent magnet is turned reciprocatably only within a preset angle range in accordance with the conductive direction of the stator coil. However, its specific structure, which has no direct bearing on the specific structure of the actuator itself, will be explained only within the range of the figures shown.

Two motors M1 and M2 of Embodiment 2 are identical in structure. The stator of the one motor M1 includes a stator frame 34, a coil 35, and two yokes 36 and 37, and the stator frame 34 is fastened to the base plate 21 by the screws 30 and 31. The stator of the other motor M2 includes a stator frame 38, a coil 39, and two yokes 40 and 41, and the stator frame 38 is fastened to the base plate 21 by the screws 32 and 33. Only the structure of the one stator will be specifically explained here. The stator frame 38 is provided with a cylindrical bobbin and the coil 35 is wound around on its periphery. The yokes 36 and 37, each having two legs, are made to overlap so that one leg of each yoke is inserted into a hollow of the bobbin and tops of the two legs are constructed as magnetic poles of the stator. In FIG. 8, the two yokes 36 and 37, although not clearly shown, has no identical shape and the top of each leg that is not inserted into the bobbins is also configured to serve as the magnetic bar described in Embodiment 1.

A rotor 42 of the one motor M1 is journaled by the base plate 21 and the stator frame 34, while a rotor 43 of the other motor M2 is journaled by the base plate and the stator frame 38.

The magnetic poles of individual stators are made opposite to the peripheral surfaces of the rotors 42 and 43. The rotors 42 and 43 are made with permanent magnets, and tops of arms 44 and 45 constructed integrally with the permanent magnets and extending radially are provided with output pins 46 and 47, respectively, parallel to their rotary axes. The output pins 46 and 47 pass through individual circular arc slots, not shown, provided in the base plate 21 so that the one output pin 46 is fitted into the slots 25a and 26a of the shutter blades 25 and 26 in the blade chamber and its top is inserted into a slot 24b of the cover plate 24. The other output pin 47 is fitted into the slots 27b, 28a, and 29b of the three blades 27, 28, and 29 and its top is inserted into a slot 24c of the cover plate 24. Also, in FIG. 9, the rotors 42 and 43 and the arms 44 and 45 constructed as mentioned above are indicated by two-dot chain lines and the output pins 46 and 47 are shown by cross section.

According to the structure of Embodiment 2, as stated above, the base plate 21 and the cover plate 24 constituting the blade chamber are interposed between the transparent plate 2 and the photographing optical system 3 in the body 1, and thus in FIG. 7, it is possible to shift the two motors toward the left and to place a part of the photographing optical system 3 on the right side of the motors. As such, the unit of Embodiment 2 in which the shutter device and the filter device are integrated will be placed in a state where the space efficiency is extremely improved. Moreover, the thickness of the body 1

(the dimension in the lateral direction in FIG. 7) can be reduced accordingly, and space provided under the photographing optical system 3 can be more effectively utilized than in Embodiment 1. In Embodiment 2 also, the transparent plate 2 is mounted in the body 1 so as to cover the aperture 1a for photography, and hence, as described in Embodiment 1, it is avoidable that the finger may touch internal members or dust may penetrate into the interior.

Subsequently, the operation of Embodiment 2 will be briefly explained. FIG. 9 shows the initial state of Embodiment 2. The shutter blades 25 and 26 fully open the aperture 24a somewhat larger in diameter than the aperture 21a for regulating the optical path, provided on the base plate 21, and the solid-state image sensor 4 is exposed to light from the object. In this case, the coils 35 and 39 of the two motors M1 and M2 are not energized, but by the means equivalent to Embodiment 1, the rotors 42 and 43 are made to maintain this stopped state and bring the shutter blades 25 and 26 into contact with the stoppers 21e and 21f and the three blades 27, 28, and 29 into contact with the stopper 21i.

When the release button is pushed for photography, a determination is made as to whether photographing light should be attenuated in accordance with the result of photometry to photograph. In the case of the determination that the light should be attenuated, the coil 39 of the motor M2 for the filter device is first energized to turn the rotor 43 counterclockwise. Thus, by the output pin 47, the three blades 27, 28, and 29 are rotated in the counterclockwise direction simultaneously by the same angle, and abut on the stopper 21j to stop. Whereby, only the blade 28 made with the ND filter plate covers the aperture 21a provided on the base plate 21, and photographing light reaching the solid-state image sensor 4 is attenuated. After that, power to the coil 39 may be continued until photography is completed, but even though the power is disconnected, it is possible to maintain the position where the rotor 43 is turned, for the same reason as in a state of FIG. 9.

Here, a brief description will be given of the reason why the filter blade group is constructed with the three blades 27, 28, and 29 in Embodiment 2. An ordinary filter blade (group) has been designed so that, for instance, like the blade 29, a single blade having the aperture 29a is provided and the ND filter plate is cemented to the blade 29 to cover the aperture 29a. In this case, since the ND filter plate slides on and comes in contact with the base plate or the cover plate and suffers damage, the corresponding surface of the base plate or the cover plate is provided with a concavity so as not to come in contact with the base plate or the cover plate. In such a concavity, however, it is practically difficult to configure a deep concavity and warp is caused to the ND filter plate, depending on a way of cementing the ND filter plate. As a result, the ND filter plate slides on and comes in contact with the base plate or the cover plate. In addition, the cementing cost of the ND filter plate cannot be neglected. For this reason, in order to completely prevent damage to the transparent surfaces of the ND filter plate without raising the manufacturing cost, although the number of parts is increased, an overlapping structure with the three blades 27, 28, and 29 is adopted in Embodiment 2.

In Embodiment 2, the diameters of the apertures 27a and 29a of the blades 27 and 29 are made larger than that of the aperture 21a for regulating the optical path, provided on the base plate 21, but the diameters may be made smaller, depending on the density of the ND filter plate that is raw material of the blade 28. Also, although in this embodiment the filter blade group is constructed with the three blades 27, 28, and 29, the present invention is not limited to this structure and may have the structure that the ND filter plate is cemented to a single blade, as mentioned above, (described later as Embodiment 5). In Embodiment 2, the filter blade group is adopted for beam attenuation, but a stop blade can be adopted, or both of them can be used in a case. As an example of the stop blade in this case, a structure described later as Embodiment 4 is favorable.

As stated above, when the three blades 27, 28, and 29 are rotated in the counterclockwise direction and abut on the stopper 21j to stop, electric charges stored in the solid-state image sensor 4 are discharged by a signal from the exposure control circuit, and exposure for photography is started. After a predetermined time passes, the coil 35 of the motor M1 for the shutter device is energized by the signal from the exposure control circuit. Whereby, the rotor 42 is turned counterclockwise, and hence the shutter blades 25 and 26 are rotated in opposite directions by the output pin 46, close the aperture 21a, and abut on the stoppers 21g and 21h, respectively, to stop. After that, in this closed state, when imaging information is transferred to the memory device, the coil 35 is energized in a direction opposite to the above case. The rotor 42 is thus turned clockwise and causes the shutter blades 25 and 26 to perform the opening operation. When the shutter blades 25 and 26 fully open the aperture 21a and abut on the stoppers 21e and 21f respectively to stop, power to the coil 35 is disconnected.

After that, the coil 39 of the motor M2 for the filter device is energized in a direction opposite to the above case. Consequently, when the rotor 43 is turned clockwise and the three blades 27, 28, and 29 are rotated in the clockwise direction simultaneously by the output pin 47 and abut on the stopper 21i to stop, power to the coil 39 is disconnected and the filter device regains the initial state of FIG. 9.

Embodiment 3

Figure 11:
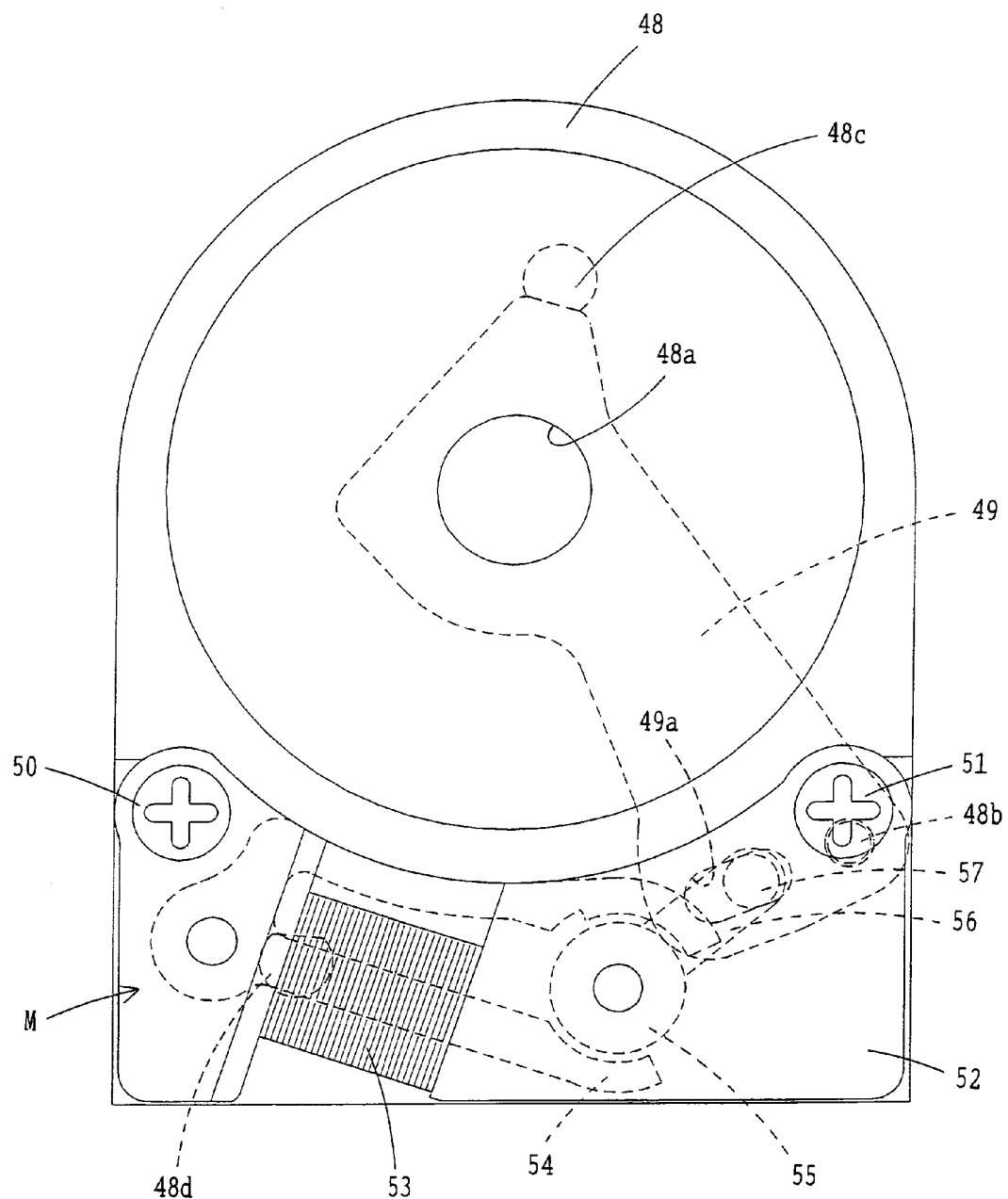
FIG. 11 is a plan view showing a shutter device used in Embodiment 3 of the portable information terminal with a camera according to the present invention, viewed as in FIG. 2.

In accordance with FIG. 11, Embodiment 3 will be explained below. In this embodiment, as in Embodiment 1, only the unit of the shutter device is assembled in the mobile phone MP with a camera of the type shown in FIG. 3. Thus, the arrangement of the entire shutter device relative to the body 1, although not shown in the figure, is the same as in FIG. 1. FIG. 11 is a plan view showing a state similar to FIG. 2. Also, although the shutter device of Embodiment 1 is provided with two shutter blades, Embodiment 3 has only one blade. An actuator for driving this shutter blade is substantially the same as the moving-magnet motor used in Embodiment 2. Hence, the description of Embodiment 3 is simplified, as compared with that of Embodiments 1 and 2.

First, the structure of Embodiment 3 will be explained. A base plate 48 has a circular aperture 48a for regulating the optical path of photographing light. On the back side of the base plate 48, a cover plate, not shown, of nearly the same contour as the base plate 48 is mounted, and a blade chamber is constructed between this cover plate and the base plate 48. The cover plate also has an aperture that is concentric with the aperture 48a and somewhat larger in diameter than the aperture 48a. Both plates are arranged so that the cover plate is located on the object side in the mobile phone and are mounted in the body, not shown, by a proper means. The base plate 48 further has a shank 48b and stoppers 48c and 48d on its blade-chamber-side surface, and a shutter blade 49 is rotatably mounted on the shank 48b. The shutter blade 49 is configured with a slot 49a.

An actuator driving the shutter blade 49 is fastened to the blade-chamber-outside surface of the base plate 48 by screws 50 and 51. This actuator, like the motor M1 or M2 in Embodiment 2, is the flat moving-magnet motor M and its specific structure is also substantially the same as that of the motor M1 or M2. Thus, the motor M of Embodiment 3 is such that the stator includes a stator frame 52, a coil 53, and a yoke 54, and the stator frame 52 is fastened to the base plate 48 by the screws 50 and 51. In the yoke 54, the tops of its two legs are constructed as magnetic poles. In Embodiment 3, the actuator is not designed so that two yokes are made to overlap as in Embodiment 2, but the top of the leg that is not inserted into the bobbin of the stator frame 52 is also configured to serve as the magnetic bar 18 described in Embodiment 1.

A rotor 55 is journaled by the base plate 48 and the stator 52. The two magnetic poles of the yoke 54 are made opposite to the peripheral surface of the rotor 55. At the top of an arm 56 extending radially from the rotor 55, an output pin 57 is provided. The output pin 57 passes through an arcuate slot, not shown, configured on the base plate 48 and is fitted into the slot 49a of the shutter blade 49 in the blade chamber. It is needless to say that, in Embodiment 3 also, like Embodiments 1 and 2, the transparent plate 2 is mounted in the body 1, not shown in FIG. 11, so as to cover the aperture 1a for photography. This also holds for the cases of individual embodiments described later.

Subsequently, the operation of Embodiment 3 will be briefly explained. FIG. 11 shows a state where the shutter blade 49 closes the aperture 48a. Such a state brought about before photography is unfavorable because the object cannot be previously observed through a display device. In the motor M used in Embodiment 3, however, when a sharp shake is given to the mobile phone on carry, the rotor 55 is sometimes rotated to cause this closed state. There is the possibility that such a situation, although not described so far, is naturally produced even in the above embodiments. In order to avoid the production of the situation, it is necessary that when the power source of the mobile phone is turned on, the coil 53 is supplied with electric current for turning the rotor 55 clockwise. For this, when the closed state is brought about as in Embodiment 3, the shutter blade 49 is rotated in the counterclockwise direction by the supply of the electric current and abuts on the stopper 48d to stop.

This stopped state is the initial state of the shutter device in Embodiment 3, and in this case, the aperture 48a is fully opened and it becomes possible to observe the object image before photography. Subsequent operations are the same as in Embodiments 1 and 2. When the release button is pushed for photography, electric charges stored in the solid-state image sensor 4 are discharged by the signal from the exposure control circuit, and exposure for photography is started. After a predetermined time passes, the coil 53 is energized by the signal from the exposure control circuit and then the rotor 55 is turned counterclockwise. Consequently, the shutter blade 49 is rotated in the clockwise direction by the output pin 57 and closes the aperture 48a, abutting on the stopper 48c to reach a state of FIG. 11. After that, when the imaging information is transferred to the memory device in this closed state, the coil 53 is energized in a direction opposite to the above description. The rotor 55 is thus turned clockwise and causes the shutter blade 49 to perform the opening operation. When the shutter blade 49 fully opens the aperture 48a and abuts on the stopper 48a to stop, power to the coil 53 is disconnected and a waiting state for the next photography is brought about.

Embodiment 4

Figure 12:
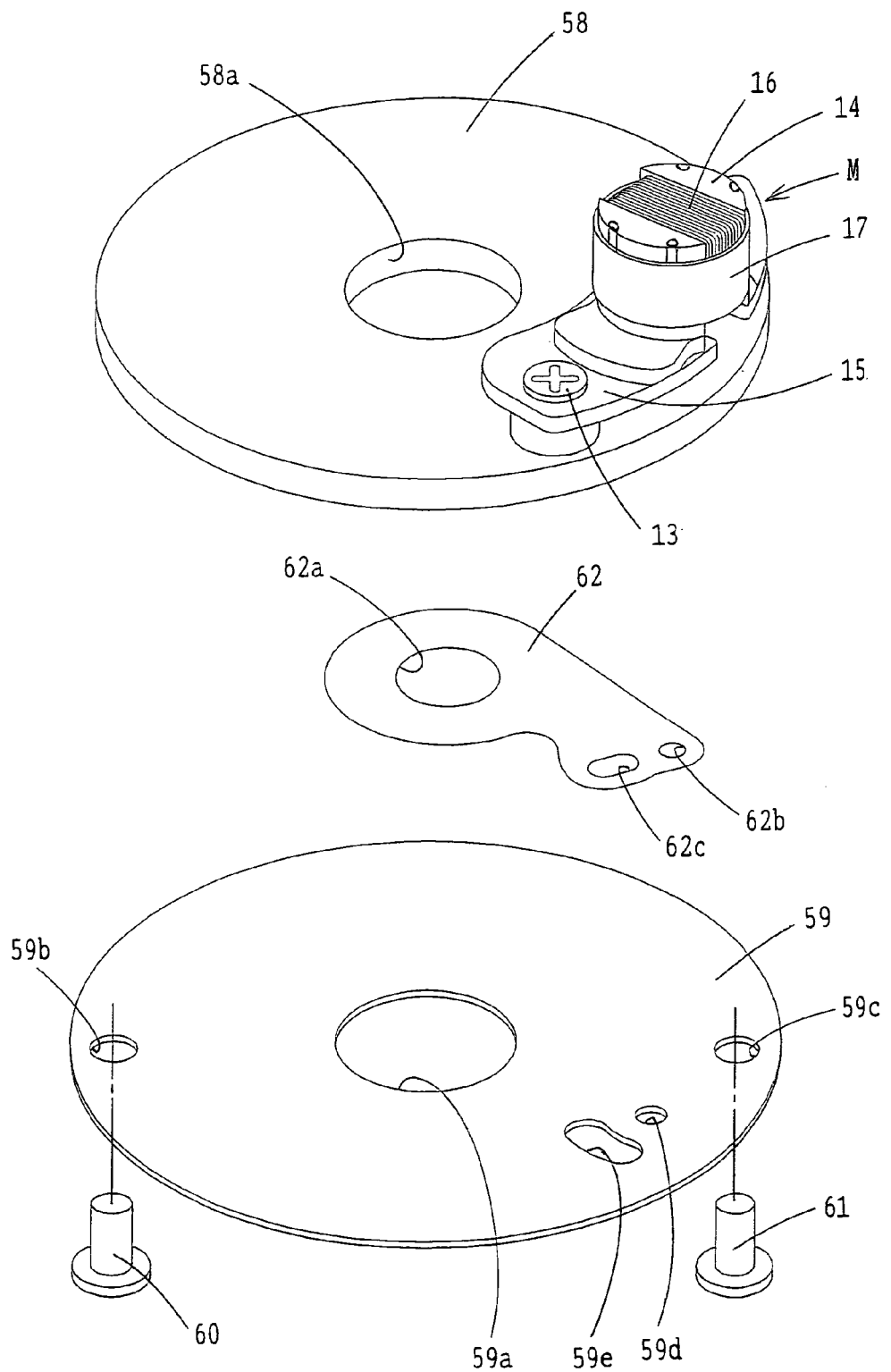
FIG. 12 is an exploded perspective view showing a stop device adopted in Embodiment 4 of the portable information terminal with a camera according to the present invention.

In accordance with FIG. 12, Embodiment 4 will be described. In this embodiment, only the unit of the shutter device is assembled in the mobile phone MP with a camera of the type shown in FIG. 3. Like the shutter device in Embodiment 1, although not clear from FIG. 12, actually, a base plate 58 is located on the side of the solid-state image sensor 4 with respect to the body 1, while a cover plate 59 is situated on the side of the aperture 1a. The actuator of Embodiment 4 has substantially the same structure as the moving-magnet motor M used in Embodiment 1, and is mounted on the base plate 58 by changing its orientation with respect to an aperture 58a. Thus, reference numerals identical with those of Embodiment 1 are used for the components of the motor M. Also, in FIG. 12, the rotor, the arm 19, and the output pin 20 are not clearly shown. However, the arrangement of the rotor will be able to be understood from the description of Embodiment 1. In Embodiment 4, the output pin 20 is provided at the top of the arm 19 extending from the rotor toward the screw 13. As the actuator of Embodiment 4, the actuator described in Embodiment 2 or 3 may be used. These also hold for the cases of individual embodiments described later.

Subsequently, the structure of Embodiment 4 will be briefly explained. The base plate 58 has the circular aperture 58a for regulating the optical path of photographing light. The cover plate 59 has an aperture 59a somewhat larger in diameter than the aperture 58a and in addition, has three round holes 59b, 59c, and 59d and a circular arc slot 59e. The round holes 59b and 59c are used to connect the cover plate 59 to the base plate 58 through screws 60 and 61. In a blade chamber provided between the base plate 58 and the cover plate 59, a stop blade 62 is placed. The stop blade 62 has an aperture 62a smaller in diameter than the aperture 58a, a round hole 62b, and a slot 62c. The round hole 62b is fitted to a shank, not shown, provided on the base plate 58 so that the stop blade 62 can be rotated on the shank, and the top of the shank is inserted into the round hole 59d of the cover plate 59. The output pin 20 constructed integrally with the rotor of the motor M is inserted into the slot 62c, and the top of the output pin 20 is inserted into the circular arc slot 59e of the cover plate 59. In Embodiment 4 also, two stoppers, not shown, corresponding to the stoppers 48c and 48d of Embodiment 3 are provided on the blade-chamber-side surface of the base plate 58.

Next, the operation of Embodiment 4 will be briefly explained. The stop blade 62 of Embodiment 4 is reciprocated and rotated, and thereby the aperture 62a is moved on and out of the aperture 58a. FIG. 12 shows a state where the aperture 62a is moved on the aperture 58a. Such a state brought about before photography is unfavorable because light from the object is attenuated and the image of the object observed by the display device becomes dark. However, as described in Embodiment 3, actually, a state where the aperture 62a is moved on the aperture 58a before photography is sometimes brought about. For this, the mobile phone is designed so that when the power switch of the mobile phone is turned on, the coil 16 is supplied with electric current for turning the rotor counterclockwise. Therefore, when the stop blade 62 is accidentally placed in a state of FIG. 12, it is turned counterclockwise at the same time the power switch is turned on, and abuts on a stopper, not shown, to stop at the stage in which the aperture 62a is completely moved out of the aperture 58a. This stopped state is the initial state of the stop device of Embodiment 4. Also, in the case where the initial state is originally brought about, when the power switch is turned on and the coil 16 is energized, the stop blade 62 is merely pressed against the stopper, not shown.

After that, when the release button is pushed for photography, the determination is made as to whether photographing is performed in that state or in an attenuation state according to the result of the measurement of the photometric circuit. In the case of the determination that light should be attenuated, the coil 16 of the motor M is energized to turn the rotor, not shown, clockwise. Consequently, the stop blade 62 is rotated in the clockwise direction by the output pin 20, not shown in FIG. 12, so that the aperture 62a is moved on the aperture 58a. After that, the stop blade 62, when reaching a state of FIG. 12, abuts on the stopper, not shown, to stop. In this way, when the stop blade 62 stops, electric charges stored in the solid-state image sensor, not shown, are discharged by a signal from the exposure control circuit and exposure for photography is started.

In Embodiment 4, the shutter device is not provided. Thus, when a predetermined time passes from the start of the exposure for photography, the electric charges stored in the solid-state image sensor, that is, the imaging information, is immediately transferred to the memory device by the signal from the exposure control circuit. After that, since the coil 16 is energizes in a direction opposite to the above description, the rotor is turned counterclockwise to move the stop blade 62 out of the aperture 58a. When the stop blade 62 is completely moved out of the aperture 58a and abuts on the stopper, not shown, to stop, power to the coil 16 is disconnected and a waiting state for the next photography is brought about. In case the determination that photographing should be performed without attenuating light in accordance with the result of the measurement of the photometric circuit is made, the coil 16 of the motor M is not energized and the electric charges stored in the solid-state image sensor, not shown, are discharged by the signal from the exposure control circuit so that exposure for photography is started immediately.

Embodiment 5

Figure 13:
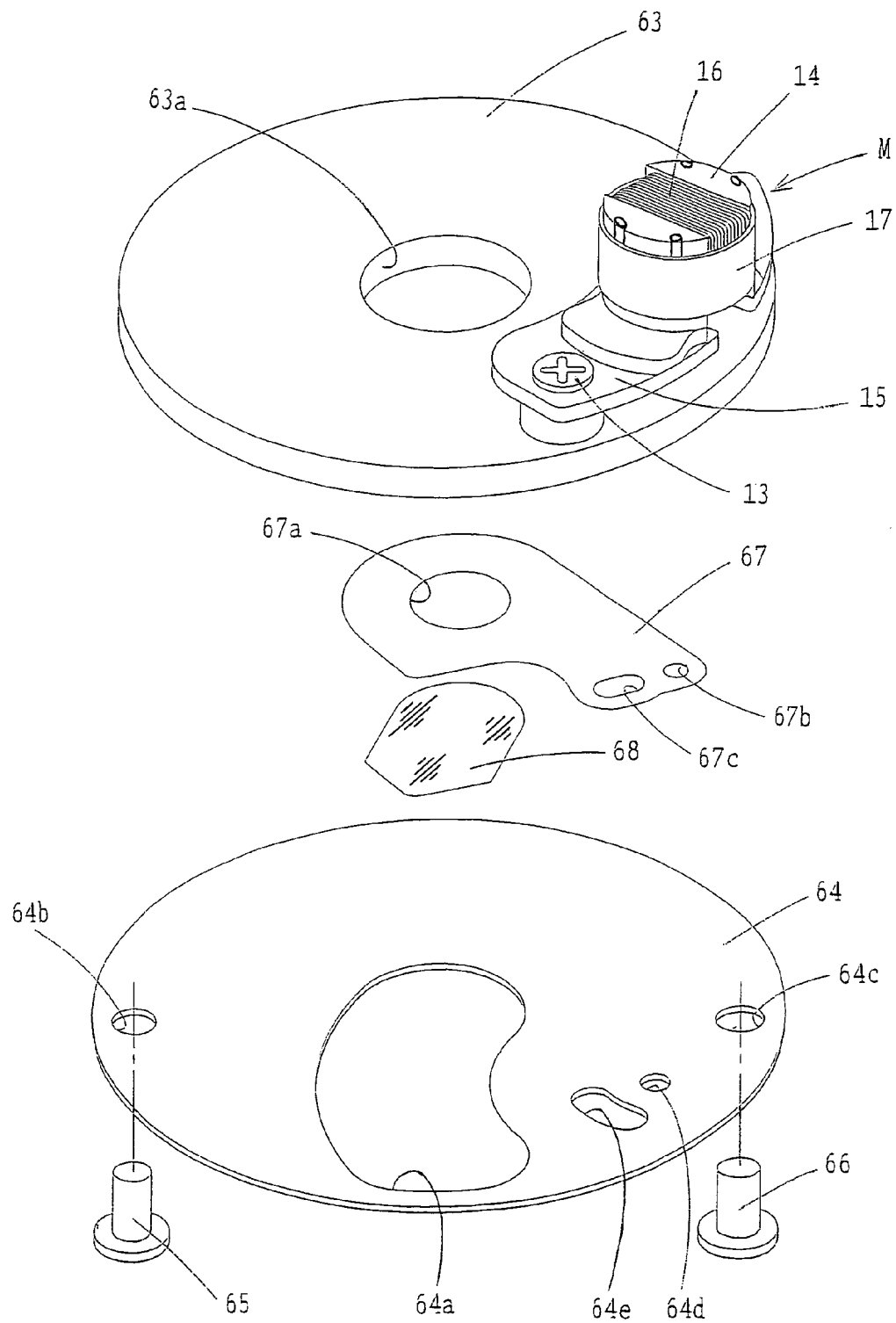
FIG. 13 is an exploded perspective view showing a filter device adopted in Embodiment 5 of the portable information terminal with a camera according to the present invention.

In accordance with the exploded perspective view of FIG. 13, Embodiment 5 will be explained. In this embodiment, only the unit of the filter device is assembled in the mobile phone MP with a camera of the type shown in FIG. 3. Like the shutter device in Embodiment 1, a base plate 63 is located on the side of the solid-state image sensor 4 with respect to the body 1, while a cover plate 64 is situated on the side of the aperture 1a. The actuator of Embodiment 5, as in Embodiment 4, has substantially the same structure as the moving-magnet motor M used in Embodiment 1 and is mounted on the base plate 63. Thus, reference numerals identical with those of Embodiments 1 and 4 are used for the components of the motor M.

Next, the structure of Embodiment 5 will be described. The base plate 63 has a circular aperture 63a for regulating the photographing optical path. The cover plate 64 has a large arcuate aperture 64a combining an aperture for the optical path from the object, larger in diameter than the aperture 63a with an aperture necessary as a relief portion provided so as not to come in contact with an ND filter plate 68 described later, and further has three round holes 64b, 64c, and 64d and a circular arc slot 64e. The round holes 64b and 64c are used to receive screws 65 and 66, respectively, for fastening the cover plate 64 to the base plate 63. In a blade chamber provided between the base plate 63 and the cover plate 64, a filter blade including a blade 67 and the ND filter plate 68 is placed. The blade 67 is provided with an aperture 67a smaller in diameter than the aperture 63a. The ND filter plate 68 is cemented onto the cover-plate-64-side surface of the blade 67 so as to cover the aperture 67a.

In addition to the aperture 67a, the blade 67 has a round hole 67b and a slot 67c. The round hole 67b is fitted to a shank, not shown, provided on the base plate 63 so that the blade 67 can be rotated on the shank, and the top of the shank is inserted into the round hole 64d of the cover plate 64. The output pin 20 constructed integrally with the rotor of the motor M is inserted into the slot 67c, and the top of the output pin 20 is inserted into the circular arc slot 64e of the cover plate 64. In Embodiment 5 also, two stoppers, not shown, corresponding to the stoppers 48c and 48d of Embodiment 3 are provide on the blade-chamber-side surface of the base plate 63.

Also, in Embodiment 5, the diameter of the aperture 67a is smaller than that of the aperture 63a, but as is well known, when the density of the ND filter plate 68 is low, the aperture 67a may have a diameter larger than the aperture 63a. In Embodiment 5, the cover plate 64 is made with a thin plate material. To prevent the ND filter plate 68 from coming in contact with the cover plate 64, the cover plate 64 is provided with an aperture as a relief portion so that the aperture is connected with the circular aperture for the photographing optical path. However, when the cover plate 64 is made with a thick material, there is no need to configure the relief portion as the aperture, and a concavity may be configured along the operating area of the ND filter plate 68 on the blade-chamber-side surface of the cover plate 64. The ND filter plate 68 may also be cemented onto the base-plate-63-side surface of the blade 67. In this case, the base plat 63 is so thick that the concavity mentioned above is configured as the relief portion.

The filter blade of Embodiment 5 constructed as mentioned above is operated in exactly the same way as the stop blade 62 of Embodiment 4. Thus, in order to avoid repetition, the description of its operation is eliminated.

Embodiment 6

Figure 14:
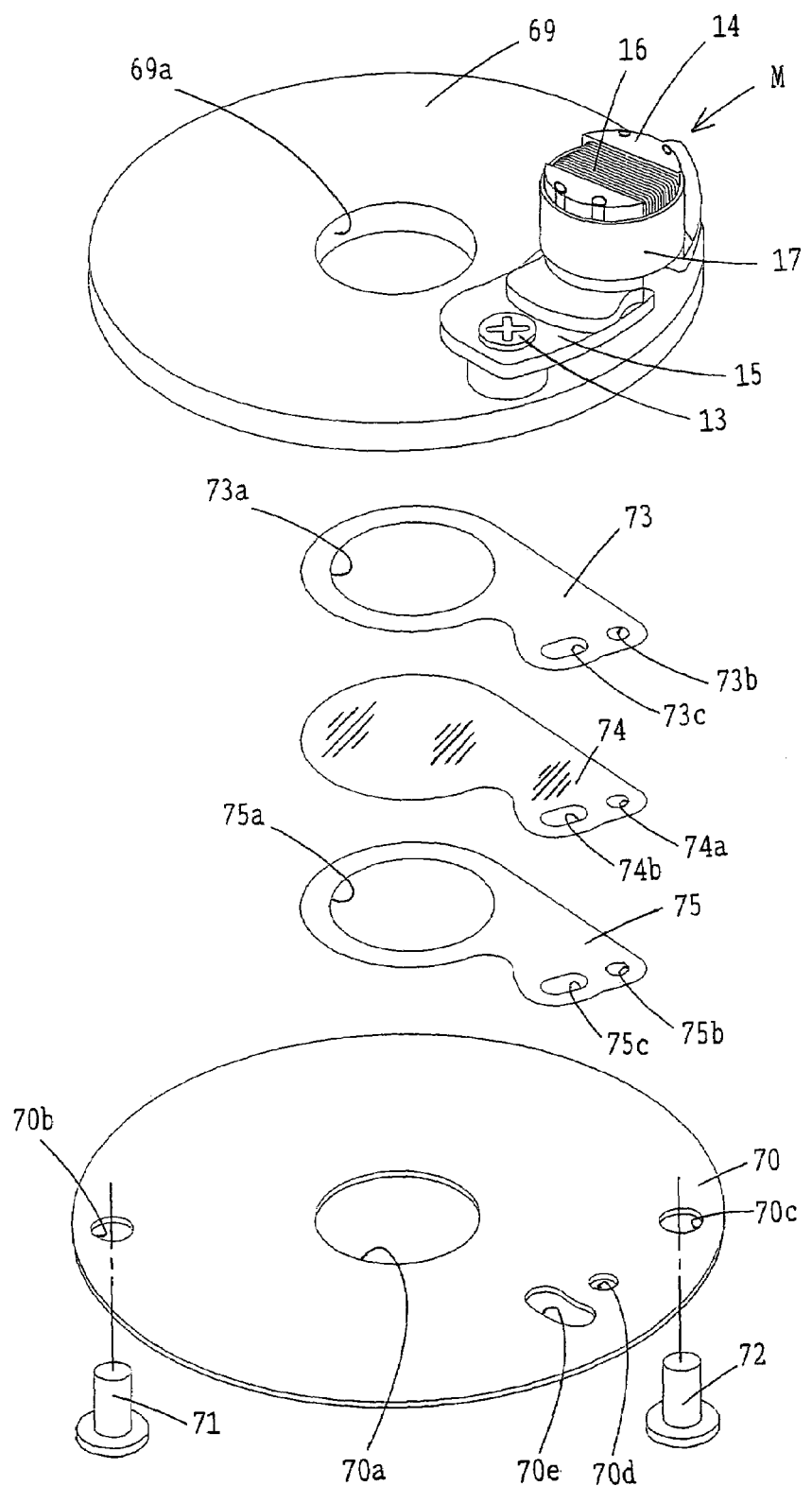
FIG. 14 is an exploded perspective view showing a filter device adopted in Embodiment 6 of the portable information terminal with a camera according to the present invention.

In accordance with the exploded perspective view of FIG. 14, Embodiment 6 will be explained. In this embodiment, like Embodiment 5, only the unit of the filter device is assembled in the mobile phone MP with a camera of the type shown in FIG. 3. However, the structure of a filter blade group is different from that of FIG. 13. The filter blade group of Embodiment 6 is substantially the same as that used in Embodiment 2. A base plate 69 is located on the side of the solid-state image sensor 4 with respect to the body 1 shown in FIG. 3, while a cover plate 70 is situated on the side of the aperture 1a. The actuator of Embodiment 6 is constructed in the same way as in Embodiment 4 or 5 and is mounted on the base plate 69 through the same placement. Thus, in Embodiment 6 also, reference numerals identical with those of Embodiments 1, 4, and 5 are used for the components of the motor M.

Subsequently, the structure of Embodiment 6 will be explained. The base plate 69 has a circular aperture 69a for regulating the optical path of photographing light. The cover plate 70 assumes the same shape as the cover plate 59 of Embodiment 4 and has an aperture 70a for the optical path from the object, larger in diameter than the aperture 69a; three round holes 70b, 70c, and 70d; and a circular arc slot 70e. The round holes 70b and 70c are used to receive screws 71 and 72, respectively, for fastening the cover plate 70 to the base plate 69. In the blade chamber provided between the base plate 69 and the cover plate 70, the filter blade group is placed. The filter blade group of Embodiment 6 is constructed with three overlapping blades 73, 74, and 75. The blades 73 and 75 assume exactly the same shape and have apertures 73a and 75a somewhat larger than the aperture 69a of the base plate 69, round holes 73b and 75b, and slots 73c and 75c, respectively.

The blade 74 is made with the ND filter plate and has a round hole 74a and a slot 74b. The round holes 73b, 74a, and 75b are fitted to a shank, not shown, provided on the base plate 69 so that the blade 74 can be rotated on the shank, and the top of the shank is inserted into the round hole 70d of the cover plate 70. The slots 73c, 74b, and 75c are caused to receive the output pin 20 constructed integrally with the rotor of the motor M, and the top of the output pin 20 is inserted into the arcuate slot 70e of the cover plate 70. In Embodiment 6 also, two stoppers, although not shown, corresponding to the stoppers 48c and 48d of Embodiment 3 are provided on the blade-chamber-side surface of the base plate 69.

The filer blade group of Embodiment 6 constructed as mentioned above is operated in exactly the same way as the stop blade 62 of Embodiment 4 or the filter blade 67 of Embodiment 5. Thus, in order to avoid repetition, the description of its operation is eliminated.

Embodiment 7

Figure 15:
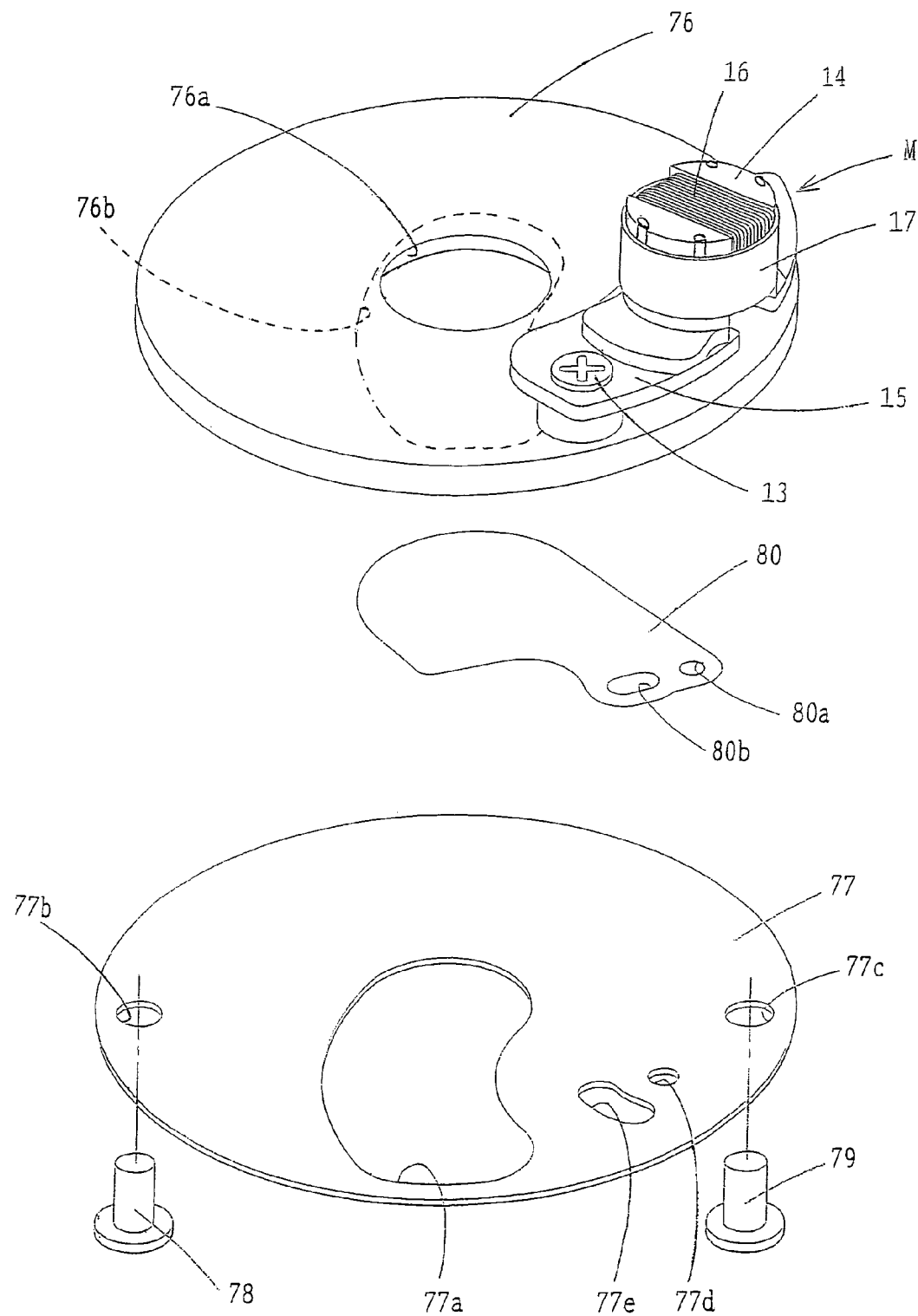
FIG. 15 is an exploded perspective view showing a filter device adopted in Embodiment 7 of the portable information terminal with a camera according to the present invention.

Finally, in accordance with FIG. 15, Embodiment 7 will be described. In this embodiment, like Embodiment 5, only the unit of the filter device is assembled in the mobile phone MP with a camera of the type shown in FIG. 3. Like the shutter device in Embodiment 1, a base plate 76 is located on the side of the solid-state image sensor 4 with respect to the body 1, while a cover plate 77 is situated on the side of the aperture 1a. The actuator, as in Embodiment 4, has substantially the same structure as the moving-magnet motor M used in Embodiment 1 and is mounted on the base plate 76. Thus, reference numerals identical with those of Embodiments 1, 4, 5, and 6 are used for the components of the motor M.

Subsequently, the structure of Embodiment 7 will be explained. The base plate 76 has an aperture 76a for regulating the photographing optical path. In order to prevent the base plate 76 from coming in contact with, at least, the surface of the filter blade 80 described later, covering the aperture 76a, a concavity 76b is circularly configured as a relief portion on the blade-chamber-side surface of the base plate 76. The cover plate 77 has a large circular arc aperture 77a, like the aperture 64a of FIG. 13, combining an aperture for the optical path from the object, larger in diameter than the aperture 76a with an aperture necessary as relief portion provided so as not to come in contact with the filter blade 80, and further has three round holes 77b, 77c, and 77d and a circular arc slot 77e. The round holes 77b and 77c are used to receive screws 78 and 79, respectively, for fastening the cover plate 77 to the base plate 76.

In a blade chamber provided between the base plate 76 and the cover plate 77, the filter blade 80 is placed, which is made of the ND filter plate configured into a blade shape. The filter blade 80 has a round hole 80a and a slot 80b. The round hole 80a is fitted to a shank, not shown, provided on the base plate 76 so that the filter blade 80 can be rotated on the shank, and the top of the shank is inserted into the round hole 77d of the cover plate 77. The slot 80b is caused to receive the output pin 20 constructed integrally with the rotor of the motor M, and the top of the output pin 20 is inserted into the slot 77e of the cover plate 77. In Embodiment 7 also, two stoppers, although not shown in the figure, corresponding to the stoppers 48c and 48d of Embodiment 3 are provided on the blade-chamber-side surface of the base plate 76. If free spaces in height are admitted on the relief portion, same effect can be achieved by configuring there a convex guide portion similar in shape to the relief portion mentioned above.

The filter blade of Embodiment 7 constructed as mentioned above is operated in the same way as in Embodiment 5. Thus, in order to avoid repetition, the description of its operation is eliminated.

Also, in any of the above embodiments, the blade chamber is provided between the base plate and the cover plate, but the shutter device or a stop device that has no blade chamber, such as that described in Japanese Patent Laid open publication No. 2000-292827, is also applicable to the present invention. When two devices are constructed as one unit like Embodiment 2, two blade chambers may be constructed as is well known. Although in above embodiments the moving-magnet motor is used as the actuator, the driving source of the present invention is not limited to the motor of this type. It may be a step motor or may be a type of motor whose operation is performed in only one direction by a spring, such as a plunger.

INDUSTRIAL APPLICABILITY

In the portable information terminal with a camera of the present invention, the blade members of the shutter device, the stop device and the like and the base plate mounting the blade members are arranged between the aperture for photography of the body and the photographing optical system, and the transparent plate is mounted on the aperture for photography. This is favorable for the slim design of the body and the effective utilization of space in the interior of the body, and brings about an image of good quality without enlarging the body.

The invention claimed is:

1. A portable information terminal with a camera, comprising:
   a body provided with an aperture for photography;
   a transparent plate configured and mounted in the body so as to cover the aperture for photography;
   a photographing optical system unit comprising a photographing optical system placed opposite to the transparent plate in the body and including plural lenses mounted to a lens frame, and a solid-state image sensor located at an image plane of the photographing optical system; and
   a blade driving unit comprising a base plate located between the transparent plate and the photographing optical system unit in the body and having an aperture for regulating an optical path of photographing light, at least one blade member being reciprocatably mounted on the base plate and being movable on and out of the aperture for regulating the optical path, and an actuator mounted adjacent to the lens frame on a photographing-optical-system-side surface of the base plate to drive the blade member.

2. A portable information terminal with a camera according to claim 1, further comprising:
   at least one second blade member reciprocatably mounted on the base plate, movable into and out of the aperture for regulating the optical path; and
   a second actuator mounted on the base plate, driving the second blade member, wherein one of the blade member and the second blade member is a shutter blade and a remaining blade member is a blade for beam attenuation.

3. A portable information terminal with a camera according to claim 2, wherein the blade for beam attenuation is a stop blade having an aperture smaller than the aperture for regulating the optical path, movable into and out of the aperture for regulating the optical path and is rotatably mounted on the base plate.

4. A portable information terminal with a camera according to claim 2, wherein the blade for beam attenuation includes first and second blade members, each having an aperture, the first and second blade members being movable into and out of the aperture for regulating the optical path, and a third blade member made with a filter plate, sandwiched between the first and second blade members so as to cover apertures of the first and second blade members, the first, second and third blade members being rotatably mounted at one position of the base plate.

5. A portable information terminal with a camera according to claim 1, wherein the blade member is a stop blade having an aperture smaller than the aperture for regulating the optical path, movable into and out of the aperture for regulating the optical path, and is rotatably mounted on the base plate.

6. A portable information terminal with a camera according to claim 1, wherein the blade member is a filter blade having an aperture, movable into and out of the aperture for regulating the optical path, and mounted with a filter plate on one surface in order to cover the aperture, and wherein the filter blade is interposed between the base plate and a cover plate having the aperture for the optical path, and one of the base plate and the cover plate is provided with a relief portion so as to avoid coming in contact with the filter plate when the filter blade is rotated.

7. A portable information terminal with a camera according to claim 1, wherein the blade member includes two blade members, each having an aperture, movable into and out of the aperture for regulating the optical path, and a single blade member made with a filter plate, sandwiched between the two blade members so as to cover apertures of the two blade members, and these three blades are rotatably mounted at one position of the base plate.

8. A portable information terminal with a camera according to claim 1, wherein the blade member is a single filter blade made with a filter plate, and wherein the filter blade is interposed between the base plate and a cover plate having an aperture for the optical path, and each of the base plate and the cover plate is provided with a relief portion so as to avoid coming in contact with the filter plate when the filter blade is rotated.

9. A portable information terminal with a camera according to any one of claims 1-8, loaded into a mobile phone.

10. A portable information terminal with a camera according to any one of claims 1-8, loaded into a personal digital assistant (PDA).

11. A portable information terminal with a camera according to any one of claims 1-8, loaded into a personal computer.

* * * * *